United States Patent Office 3,111,341
Patented Nov. 19, 1963

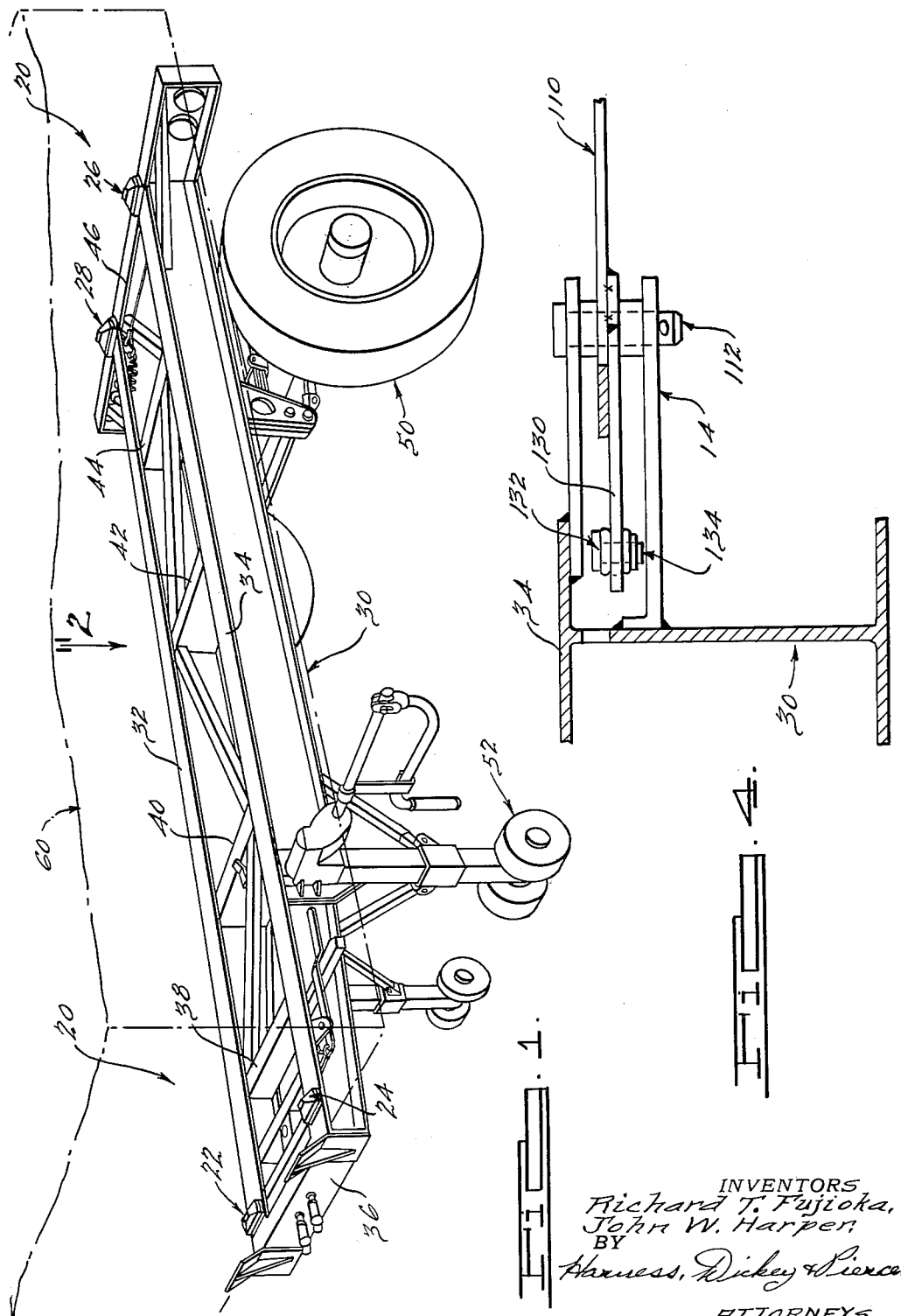

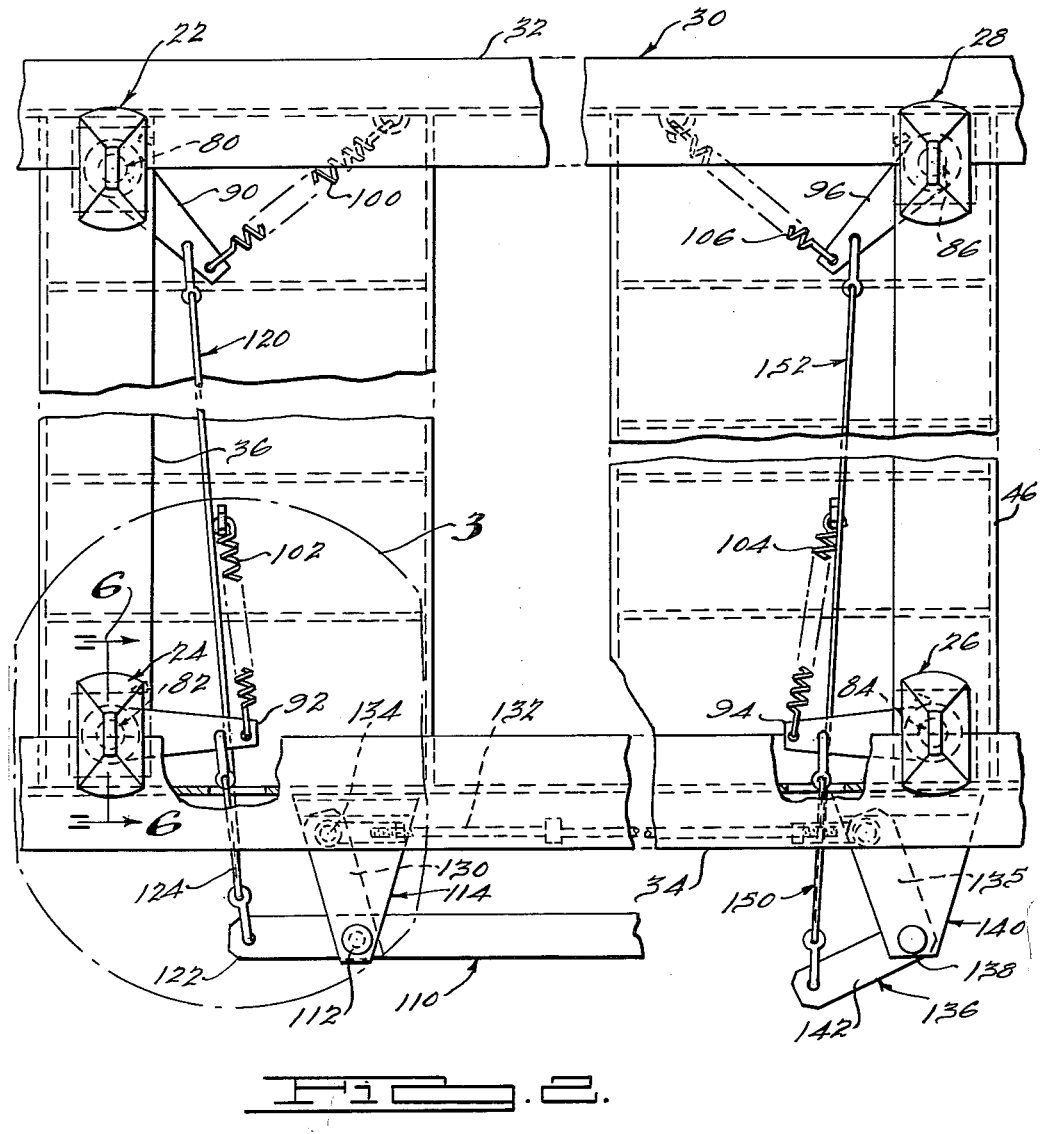

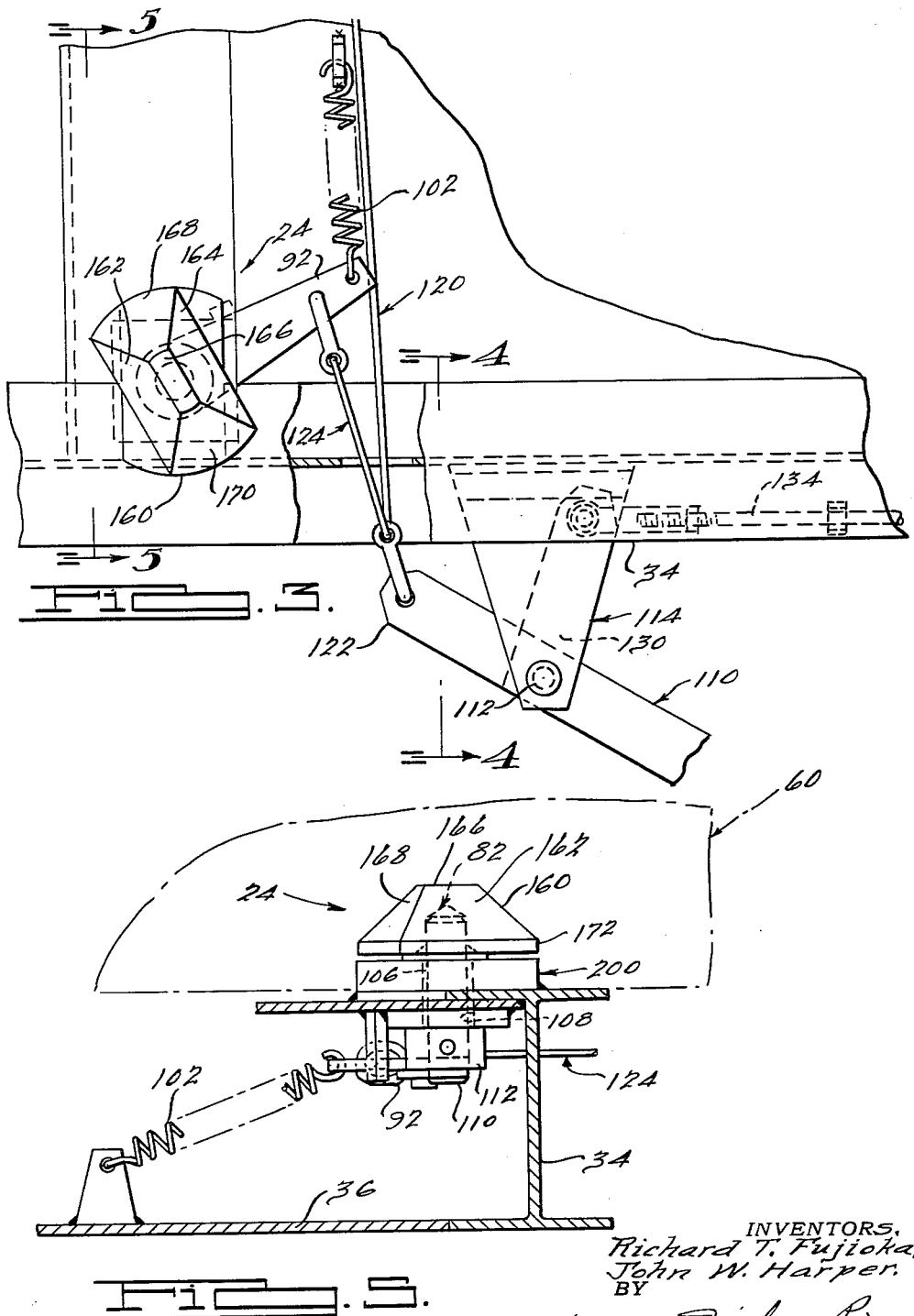

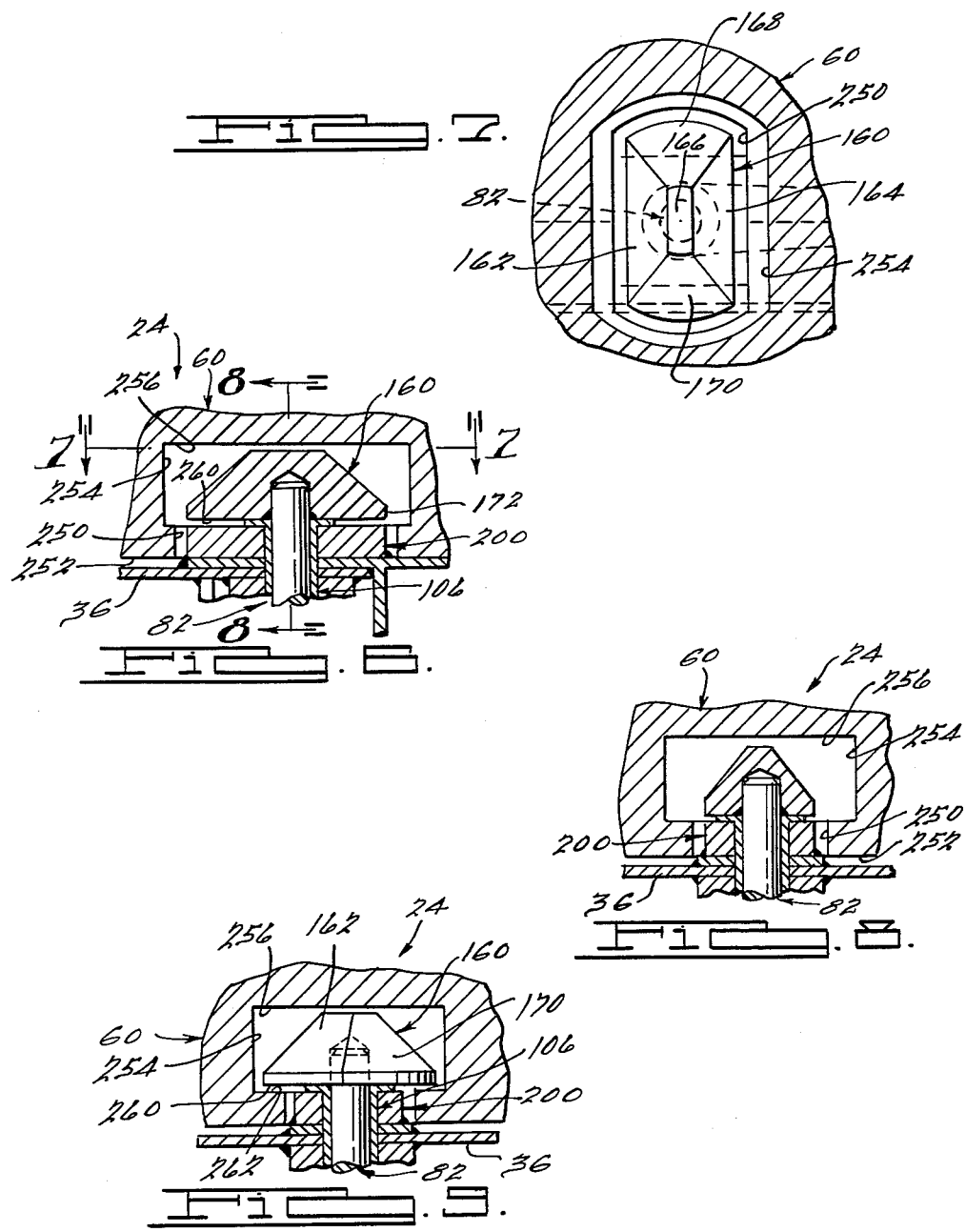

3,111,341
AUTOMATIC LOCKING SYSTEM FOR COUPLING A SHIPPING CONTAINER TO A VEHICLE FRAME OR THE LIKE
Richard T. Fujioka, Oxford, and John W. Harper, Detroit, Mich., assignors to Fruehauf Corporation, a corporation of Michigan
Filed Apr. 2, 1962, Ser. No. 184,033
1 Claim. (Cl. 296—35)

This invention relates generally to shipping apparatus and more particularly to a novel system for automatically coupling a shipping container to a vehicle frame or the like.

The advent of the modular sealable shipping container of the type disclosed in application Serial No. 112,635, filed May 25, 1961, for Shipping Apparatus, and assigned to the assignee of the present invention, has greatly speeded up the shipment of goods since standardized handling equipment can be utilized for the transfer of the container. However, the widespread use of such containers has pointed up certain deficiencies in the available handling equipment. More particularly, there is a need for an improved means for coupling the containers to a vehicle frame, the deck of a ship, a loading dock, or to other container supporting structures.

One fundamental requirement of a mechanism for coupling a shipping container to a supporting structure is that it be automatically operable to the locked condition so that, upon inadvertent miscoupling of the container to the supporting structure, vibration, inertia forces, or the weight of the shipping container itself, is sufficient to effect coupling of the container to a supporting structure.

Further, a coupling system for a shipping container must be capable of withstanding the large shear loads to which it is subjected due to, for example, rapid acceleration or deceleration of the supporting structure.

Also, a coupling system should be relatively simple in operation so as to be operable by a single control which concomitantly effects locking and unlocking of each of a plurality of locks between the shipping container and supporting structure.

The aforementioned requirements of a system for coupling a shipping container to a supporting structure are fulfilled to a heretofore unknown degree by the coupling system of the instant invention.

In accordance with the instant invention, a plurality of pyramid-shaped locks are oriented in a generally rectangular array on the supporting structure. The pyramid locks are interconnected for both concomitant and independent rotation about vertically directed axes. The pyramid locks cooperate with complementary recesses and apertures in a shipping container to effect coupling thereof to a supporting structure.

Accordingly, one object of the instant invention is an improved system for coupling a container to a supporting structure.

Another object is an automatic coupling system for a shipping container.

Another object is a coupling system including a lock that is self-aligning with a complementary aperture in a shipping container.

Another object is a coupling system for a shipping container wherein locks are individually rotatable to a locked condition upon engagement with a shipping container.

Another object is a lock system for a shipping container wherein the locks are concomitantly rotatable to an unlocked condition by a single manual operator.

Other objects and advantages of the instant invention will be apparent in the following specification, claim and drawings, wherein:

FIGURE 1 is a perspective view of a coupling system in accordance with an exemplary embodiment of the instant invention shown in operative association with a vehicle frame;

FIG. 2 is a top view of the lock system taken in the direction of the arrow 2 of FIGURE 1;

FIG. 3 is an enlarged fragmentary view taken within the area of the circle 3 of FIG. 2 and with the lock and manual operator rotated to the locked condition;

FIG. 4 is a cross sectional view taken substantially along the line 4—4 of FIG. 3;

FIG. 5 is a cross-sectional view taken substantially along the line 5—5 of FIG. 3;

FIG. 6 is a top view of a pyramid lock in the ready-to-couple condition taken substantially along the line 6—6 of FIG. 2;

FIG. 7 is a cross-sectional view taken substantially along the line 7—7 of FIG. 6;

FIG. 8 is a cross-sectional view taken substantially along the line 8—8 of FIG. 6; and FIG. 9 is a cross-sectional view similar to FIG. 8 with the pyramid lock rotated to the locked condition.

As best seen in FIGURE 1 of the drawings, a coupling system 20, in accordance with an exemplary constructed embodiment of the present invention, comprises a plurality of pyramid locks 22, 24, 26 and 28 arranged in a generally rectangular array on a vehicle frame 30. The frame 30 comprises a pair of longitudinal frame members 32 and 34 with longitudinally spaced cross members 36, 38, 40, 42, 44 and 46 thereon. The frame 30 is supported by a conventional wheel suspension 50 and landing gear 52. It is to be understood that the frame 30 is exemplary of a supporting structure for a shipping container 60, shown in phantom lines in FIGURE 1. The frame 30 may take other forms, for example, a railway car or a complementary platform on a ship, loading dock, airplane, or other transportation device.

As best seen in FIG. 2 of the drawings, the pyramid locks 22, 24, 26 and 28 are supported for rotation about generally parallel vertical axes by pins 80, 82, 84 and 86, respectively. Rotation of the pyramid locks 22, 24, 26 and 28 is effected by a plurality of operating arms 90, 92, 94 and 96 that are coupled to the lower ends of the shafts 80, 82, 84 and 86, respectively.

The arms 90, 92, 94 and 96 are normally biased counterclockwise, as seen in FIG. 2 by a plurality of helical tension springs 100, 102, 104, and 106, respectively, that are secured to complementary hooks on the frame 30. The pyramid locks 22, 24, 26 and 28 are thus normally individually biased to the locked condition as best seen in FIG. 3.

The pyramid locks 22, 24, 26 and 28 are movable to the unlocked condition, shown in FIG. 2, by a manual operator 110 that is supported for rotation with respect to the frame 30 by a pin 112 that extends through the operator 110 and a complementary support bracket 114 that is secured to the frame 30, as by welding.

Rotation of the operator 110 is transmitted to the lock 22 by a flexible cable 120 that is secured to an end portion 122 of the operator 110 and to the arm 90 on the lower end of the support shaft 80 of the pyramid lock 22.

Rotation of the operator 110 is transmitted to the arm 92 by a flexible cable 124 which is also attached to the outer end portion 122 of the manual operator 110.

As best seen in FIGS. 2 and 4, the manual operator 110 has a crank portion 130 secured thereto, as by welding, and rotatable therewith about the pin 112. The crank 130 is coupled to an operating rod 132, as by a pin 134, the rod 132 being connected to an arm portion 135 of a bellcrank 136 at the opposite end of the frame member 134.

The crank 136 is supported for rotation by a pin 138 that extends through a suitable bracket 140 on the frame member 34.

An arm 142 of the bellcrank 136 is coupled to the arm 94 of pyramid lock 26 as by a flexible cable 150 and to the arm 96 of the pyramid lock 28 as by a cable 152. Thus, it will be seen that, upon counterclockwise rotation of the manual operator 110, the pyramid locks 22, 24, 26 and 28 are concomitantly biased clockwise to the unlocked condition, shown in FIG. 2, against the normal bias of the springs 100, 102, 104 and 106.

As will be discussed in greater detail, the flexible cables 120, 124, 150 and 152 accommodate individual rotation of the pyramid locks 22, 24, 26 and 28, respectively, to the unlocked condition shown in FIG. 2 due to, for example, the weight of a container.

As best seen in FIG. 5 of the drawings, the pyramid lock 24, which is exemplary of the locks 22, 26 and 28, comprises a head portion 160 having upwardly convergent side walls 162 and 164 terminating in a generally rectangular top face 166. Opposite end portions 168 and 170 of the head 160 are of upwardly convergent conical section terminating in the generally flat upper top face 166. The head 160 of the pyramid lock 24 has a vertically extending edge face 172 which extends around the lower periphery thereof.

The pyramid lock 24 is supported for rotation with respect to an underlying shear block 200, of like horizontal cross section, by the pin 82. The pin 82 is secured to the head portion 160 of the pyramid lock 24 by, for example, a pin 173, the pin 82 extending through a complementary bushing 106 that is received in an aperture 108 in the shear block 200. A lower end portion 110 of the pin 82 is received in a hub portion 112 of the operating arm 92.

As best seen in FIGS. 6 through 9, the container 60 is provided with a plurality of apertures 250 in a generally rectangular array complementary to the orientation of the pyramid locks 22, 24, 26, and 28. For the purpose of clarity, only one of the apertures 250 will be described, it being understood that it is exemplary of the apertures and associated structures at the other corners of the shipping container 60.

As best seen in FIG. 6, the aperture 250 extends verticaly upwardly from a bottom face 252 of the container 60 and terminates in a recess 254 of similar cross-section, but of relatively larger dimensions than the aperture 250. The recess 254 has an upper or top wall 256 spaced vertically from the bottom face 252 of the container for the accommodation of the head 160 of the lock 24.

As best seen in FIG. 7, the head 160 of the lock 24 is receivable within the aperture 250 in the container 60 when the head 160 is rotated to what may be termed the aligned condition shown in FIG. 2. Rotation of the head 160 to an aligned condition is effected either by rotation of the manual operator 110 in the counterclockwise direction or, by engagement of the container 60 with the truncated conical side walls 162, 164, 168 and 170 of the head 160, which cams the head 160 in the clockwise direction.

It is to be noted that the shear block 200 is of a vertical dimension complementary to the vertical dimensions of the aperture 250 so that, upon movement of the head portion 160 into the recess 254 in the container 60, the shear block 200 is horizontally aligned with the side walls of the aperture 250 and the head 160 is rotatable under the bias of the operating spring 102 to position a lower edge face 260 thereof over a horizontally extending shoulder 262 between the recess 254 and aperture 250. Thus, it will be seen that, upon rotation of the head 160 of the lock 24 to the position shown in FIGS. 3 and 9, horizontal movement of the container 60 with respect to the lock 24 is precluded.

The locks 22, 24, 26 and 28 are rotated to the aligned condition to facilitate disengagement of the container 60 from the frame or supporting structure 30 by rotation of the manual operator 110 counterclockwise, as discussed hereinbefore.

It is to be noted that the locks 22, 24, 26 and 28 are constantly biased toward the locked condition by the springs 100, 102, 104 and 106. This facilitates automatic coupling of the container 60 to the frame 30 when, for example, one or more of the locks 22, 24, 26 and 28 are properly coupled within their complementary recesses in the container 60, but others of the locks are not properly seated with respect to the container 60. When this condition obtains, the weight of the container 60 tends to rotate each miscoupled lock clockwise against the bias of its associated operating spring, which rotation is accommodated by the flexible cable extending between its associated operating arm and the manual operator 110.

Upon rotation of the head portion 160 of each miscoupled lock into the aligned condition with respect to its associated aperture 250, the weight of the container 60, inertia forces, or vibration tends to move the container 60 downwardly so that the head portion 160 of the lock is rotatable relative to the shear block 200 thereof to the coupled condition under the bias of its associated operating spring.

It is also to be noted that the shaft 82 supporting the head portion 160 of each of the locks is not subjected to bending stress due to shear forces between the container 60 and the frame 30. Such shear forces are accepted by the shear blocks 200, the head 160 associated therewith functioning solely to preclude vertical disassociation of the container 60 from the frame 30, until desired.

It is to be understood that the specific construction of the improved automatic locking system for coupling a shipping container to a vehicle frame or the like herein disclosed and described is presented for the purpose of explanation and illustration and is not intended to indicate limits of the invention, the scope of which is defined by the following claim.

What is claimed is:

A locking system for coupling a shipping container having a plurality of apertures on a bottom surface thereof with enlarged recesses therebehind, respectively, to a frame, said system comprising a plurality of pyramid locks on the frame disposed in a spaced array complementary to the apertures in said container and acceptable therein, each of said locks having a pyramid head portion, resilient means normally independently biasing the head portion to a lock condition, and means coupled to said locks for concomitantly rotating the head portion thereof to an uncoupled condition, said rotating means including a lost motion connection to the head portion of said lock whereby the head portion is rotatable to the uncoupled condition against the bias of said resilient means due to the weight of the container.

References Cited in the file of this patent
UNITED STATES PATENTS

| | | |
|---|---|---|
| 1,875,768 | Smith | Sept. 6, 1932 |
| 2,053,969 | Olds | Sept. 8, 1936 |
| 2,703,659 | Hutchins | Mar. 8, 1955 |
| 2,963,310 | Abolins | Dec. 6, 1960 |